United States Patent
Babcock et al.

(10) Patent No.: US 10,428,263 B2
(45) Date of Patent: Oct. 1, 2019

(54) LOW TEMPERATURE WATERLESS STIMULATION FLUID

(71) Applicants: Linde Aktiengesellschaft, Munich (DE); John A. Babcock, Houston, TX (US)

(72) Inventors: John A. Babcock, Houston, TX (US); Charles P. Siess, III, Conroe, TX (US)

(73) Assignee: LINDE AKTIENGESELLSCHAFT, Munich (DE)

(*) Notice: Subject to any disclaimer, the term of this patent is extended or adjusted under 35 U.S.C. 154(b) by 227 days.

(21) Appl. No.: 15/357,052

(22) Filed: Nov. 21, 2016

(65) Prior Publication Data

US 2017/0275520 A1  Sep. 28, 2017

Related U.S. Application Data

(60) Provisional application No. 62/311,793, filed on Mar. 22, 2016.

(51) Int. Cl.
| | | |
|---|---|---|
| E21B 43/26 | (2006.01) | |
| C09K 8/70 | (2006.01) | |
| C09K 8/64 | (2006.01) | |
| C09K 8/80 | (2006.01) | |
| C09K 8/94 | (2006.01) | |
| E21B 43/267 | (2006.01) | |

(52) U.S. Cl.
CPC ............ C09K 8/703 (2013.01); C09K 8/64 (2013.01); C09K 8/80 (2013.01); C09K 8/94 (2013.01); E21B 43/26 (2013.01); E21B 43/267 (2013.01)

(58) Field of Classification Search
CPC .................. C09K 8/703; C09K 8/94
See application file for complete search history.

(56) References Cited

U.S. PATENT DOCUMENTS

| | | |
|---|---|---|
| 3,035,637 A | 5/1962 | Allen |
| 3,316,965 A | 5/1967 | Watanabe |
| 3,319,712 A | 5/1967 | O'Brien |
| 3,368,627 A * | 2/1968 | Hurst .................. E21B 43/168 |
| | | 166/307 |

(Continued)

FOREIGN PATENT DOCUMENTS

| | | |
|---|---|---|
| DE | 102014010105 A1 | 1/2016 |
| FR | 2466606 A1 | 4/1981 |

(Continued)

OTHER PUBLICATIONS

Ginley, "Osudo Reservoir Fluid Study Jordan B No. 1 Well", http://ocdimage.emnrd.state.nm.us/imaging/filestore/SantaFeAdmin/CF/ADA-03-00539 Case Files Part 6/10796_4159.pdf, pp. 1,5; table 2, Jan. 1, 1992.

(Continued)

*Primary Examiner* — Angela M DiTrani Leff
(74) *Attorney, Agent, or Firm* — Patterson + Sheridan, LLP (57) ABSTRACT

A method of treating a subsurface formation comprises mixing an unfractionated hydrocarbon mixture with a foaming agent to form a waterless stimulation fluid comprising foam. The unfractionated hydrocarbon mixture comprises ethane, propane, butane, isobutane, and pentane plus. The method further includes increasing a pressure of the stimulation fluid and injecting the stimulation fluid into the subsurface formation.

17 Claims, 9 Drawing Sheets

(56) References Cited

U.S. PATENT DOCUMENTS

| | | | |
|---|---|---|---|
| 4,490,985 A | 1/1985 | Wells | |
| 4,511,381 A | 4/1985 | Mehra | |
| 6,230,814 B1 | 5/2001 | Nasr et al. | |
| 7,341,103 B2* | 3/2008 | Taylor | C09K 8/64 166/278 |
| 7,373,790 B2 | 5/2008 | Clare et al. | |
| 8,408,289 B2* | 4/2013 | Loree | C09K 8/64 166/90.1 |
| 8,505,332 B1 | 8/2013 | Prim | |
| 8,513,166 B2* | 8/2013 | Gatlin | C09K 8/64 166/308.1 |
| 8,844,639 B2 | 9/2014 | Gupta et al. | |
| 9,488,040 B2 | 11/2016 | Chakrabarty et al. | |
| 9,534,836 B2 | 1/2017 | Dubettier-Grenier et al. | |
| 9,725,644 B2* | 8/2017 | Babcock | C09K 8/80 |
| 2005/0189112 A1 | 9/2005 | Taylor et al. | |
| 2006/0289166 A1 | 12/2006 | Stromquist et al. | |
| 2007/0000666 A1 | 1/2007 | Vozniak et al. | |
| 2007/0187340 A1 | 8/2007 | Oresti et al. | |
| 2008/0087041 A1 | 4/2008 | Denton et al. | |
| 2012/0000660 A1 | 1/2012 | Gatlin et al. | |
| 2012/0047942 A1 | 3/2012 | Kolodziej | |
| 2013/0168086 A1 | 7/2013 | Roberts | |
| 2013/0220605 A1 | 8/2013 | Vandor | |
| 2013/0228330 A1* | 9/2013 | Loree | E21B 21/063 166/267 |
| 2013/0299167 A1* | 11/2013 | Fordyce | E21B 43/26 166/280.1 |
| 2014/0000899 A1* | 1/2014 | Nevison | E21B 43/26 166/308.1 |
| 2014/0124208 A1 | 5/2014 | Loree et al. | |
| 2014/0366577 A1* | 12/2014 | Zubrin | H04W 76/10 62/619 |
| 2015/0021022 A1 | 1/2015 | Ladva et al. | |
| 2015/0152318 A1 | 6/2015 | Travis | |
| 2015/0167550 A1 | 6/2015 | Vandervort et al. | |
| 2015/0184932 A1 | 7/2015 | Higginbotham et al. | |
| 2015/0233222 A1 | 8/2015 | Teklu et al. | |
| 2015/0368566 A1 | 12/2015 | Young et al. | |
| 2018/0238153 A1* | 8/2018 | Nevison | C09K 8/38 |

FOREIGN PATENT DOCUMENTS

| | | |
|---|---|---|
| GB | 2219818 A | 12/1989 |
| WO | 2010025540 A1 | 3/2010 |
| WO | 2012097424 A1 | 7/2012 |
| WO | 2015020654 A1 | 2/2015 |
| WO | 2016064645 A1 | 4/2016 |

OTHER PUBLICATIONS

Holtz et al., "Summary Integrated Geologic and Engineering Determination of Oil-Reserve-Growth Potential in Carbonate Reservoirs", https://www.onepetro.org/download/journal-paper/SPE-22900-PA?id=journal-paper/SPE-22900-PA, p. 1250 and 1253, Jan. 1, 1992.

Nakashima et al., "SPE-177801-MS Development of a Giant Carbonate Oil Field, Part 2: Mitigation from Pressure Maintenance Developement to Sweep Oriented IOR Development", https://www.onepetro.org/download/conference-paper/SPE-177801-MS?id=conference-paper/SPE-177801-MS, pp. 1-8 and 12-16, Jan. 1, 2015.

Pazuki et al., "A modified Flory-Huggins model for prediction of asphaltenes precipitation in crude oil", Fuel, IPC Science and Technology Press, Guildford, GB, vol. 85, No. 7-8, pp. 1083-1086, May 1, 2016.

Qing Sun et al., "Quantification of uncertainty in recovery efficiency predictions: lessons learned from 250 mature carbonate fields", SPE 84459, pp. 1-15, Jan. 1, 2005.

Rassenfoss; "In Search of the waterless fracture", JPT, Jun. 30, 2013, pp. 46-54, XP055237780.

M. Asadi et al., "Water-Free Fracturing: A Case History", Society of Petroleum Engineers, SPE-175988-MS, 14 Pages.

International Search Report and Written Opinion dated Feb. 7, 2017, Corresponding to Application No. PCT/US2016/063140.

International Search Report and Written Opinion dated Feb. 7, 2017, Corresponding to Application No. PCT/US2016/063148.

Stephen Rassenfoss, "In Search of the Waterless Fracture", JPT Emerging Technology Editor, Jun. 2013, pp. 46-54.

\* cited by examiner

LOW TEMPERATURE WATERLESS STIMULATION FLUID

CROSS REFERENCE TO RELATED APPLICATIONS

This application claims benefit of U.S. Provisional Application Ser. No. 62/311,793, filed Mar. 22, 2016, the contents of which are herein incorporated by reference in their entirety.

BACKGROUND

Field

Embodiments of the disclosure relate to methods and systems for providing stimulation fluids to treat (such as fracture or cool) a subsurface formation (such as a hydrocarbon bearing reservoir). In particular, embodiments of the disclosure relate to providing low temperature, waterless hydraulic fracturing fluids configured to fracture hydrocarbon bearing reservoirs.

Description of the Related Art

Fracture treatments are utilized to improve fluid conductivity between a wellbore and a formation of interest to increase fluid production rate and associated reserves. Hydraulic fracture treatments are typically used in low-permeability formations, in conventional reservoirs to bypass near-wellbore permeability damage, and in unconventional reservoirs to intersect induced fractures with a natural fracture network.

A typical fracture treatment injects a viscous fluid into a formation of interest to open a fracture of a desired geometry. The viscous fluid carries a proppant into the opened fracture to maintain conductivity in the fracture after the fracture treatment is completed. Viscous fluids may have features that damage the permeability of the proppant pack and/or the formation near the fracture. For example, water-based fluids may imbibe into the formation face and reduce permeability, may precipitate scale, and may cause fines migration during well flow back and clean-up.

Recent data suggests that approximately 98% of the hydraulic fracture treatments in the U.S. utilize water-based technology. Water-based technology brings with it a host of water-based chemicals including acids, biocides, and corrosion inhibitors that expand the environmental footprint and cost associated with the fracture treatment. Water-based hydraulic fracture treatments also consume groundwater and aquifers in drought-prone regions such as Texas and Oklahoma. Very large volumes of water, often millions of gallons, are used to conduct a hydraulic fracture treatment to stimulate a single well.

Thus, there is a need for new and improved stimulation fluids for treating subsurface formations.

SUMMARY

In one embodiment, a method of treating a subsurface formation comprises mixing an unfractionated hydrocarbon mixture with a foaming agent to form a waterless stimulation fluid comprising foam. The unfractionated hydrocarbon mixture comprises ethane, propane, butane, isobutane, and pentane plus. The method further includes increasing a pressure of the stimulation fluid and injecting the stimulation fluid into the subsurface formation.

In one embodiment, a method of treating a subsurface formation comprises mixing an unfractionated hydrocarbon mixture with a proppant to form a waterless stimulation fluid. The unfractionated hydrocarbon mixture comprises ethane, propane, butane, isobutane, and pentane plus. The method further comprises increasing a pressure of the stimulation fluid and injecting the stimulation fluid into the subsurface formation.

In one embodiment, a stimulation fluid system comprises a Y-Grade NGL storage unit comprising an unfractionated hydrocarbon mixture, wherein the unfractionated hydrocarbon mixture comprises ethane, propane, butane, isobutane, and pentane plus; a high pressure pump in fluid communication with the Y-Grade NGL storage unit; and at least one of a gelling unit, a foaming agent unit, and a proppant storage unit.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments of the methods and systems described herein provide a stimulation fluid for treating (such as fracturing and/or cooling) a subsurface formation (such as a hydrocarbon bearing reservoir). The stimulation fluid may be a low temperature, waterless hydraulic fracturing fluid. The stimulation fluid may comprise naturally occurring, locally available components that are non-damaging to the subsurface formation, cost effective, and can be chilled to low temperatures. The low temperature of the stimulation fluid applies a thermal shock to the subsurface formation to produce microscopic fractures that enhance permeability of the subsurface formation. When combined with hydraulic fracturing of the subsurface formation using the same or another stimulation fluid, thermally fracturing the subsurface formation using the stimulation fluid creates secondary fracturing to further increase the effective conductivity of the subsurface formation.

Y-Grade natural gas liquids (referred to herein as Y-Grade NGL) is an un-fractionated hydrocarbon mixture comprising ethane, propane, butane, isobutane, and pentane plus. Pentane plus comprises pentane, isopentane, and/or heavier weight hydrocarbons, for example hydrocarbon compounds containing at least one of C5 through C8+. Pentane plus may include natural gasoline for example.

Typically, Y-Grade NGL is a by-product of de-methanized hydrocarbon streams that are produced from shale wells and transported to a centralized facility. Y-Grade NGL can be locally sourced from a splitter facility, a gas plant, and/or a refinery and transported by truck or pipeline to a point of use. In its un-fractionated or natural state (under certain pressures and temperatures, for example within a range of 250-600 psig and at wellhead or ambient temperature), Y-Grade NGL has no dedicated market or known use. Y-Grade NGL must undergo processing before its true value is proven.

The Y-Grade NGL composition can be customized for handling as a liquid under various conditions. Since the ethane content of Y-Grade NGL affects the vapor pressure, the ethane content can be adjusted as necessary. According to one example, Y-Grade NGL may be processed to have a low ethane content, such as an ethane content within a range of 3-12 percent, to allow the Y-Grade NGL to be transported as a liquid in low pressure storage vessels. According to another example, Y-Grade NGL may be processed to have a high ethane content, such as an ethane content within a range of 38-60 percent, to allow the Y-Grade NGL to be transported as a liquid in high pressure pipelines.

Y-Grade NGL differs from liquefied petroleum gas ("LPG"). One difference is that LPG is a fractionated product comprised of primarily propane, or a mixture of fractionated products comprised of propane and butane. Another difference is that LPG is a fractioned hydrocarbon mixture, whereas Y-Grade NGL is an unfractionated hydrocarbon mixture. Another difference is that LPG is produced in a fractionation facility via a fractionation train, whereas Y-Grade NGL can be obtained from a splitter facility, a gas plant, and/or a refinery. A further difference is that LPG is a pure product with the exact same composition, whereas Y-Grade NGL can have a variable composition.

In its unfractionated state, Y-Grade NGL is not an NGL purity product and is not a mixture formed by combining one or more NGL purity products. An NGL purity product is defined as an NGL stream having at least 90% of one type of carbon molecule. The five recognized NGL purity products are ethane (C2), propane (C3), normal butane (NC4), isobutane (IC4) and natural gasoline (C5+). The unfractionated hydrocarbon mixture must be sent to a fractionation facility, where it is cryogenically cooled and passed through a fractionation train that consists of a series of distillation towers, referred to as deethanizers, depropanizers, and debutanizers, to fractionate out NGL purity products from the unfractionated hydrocarbon mixture. Each distillation tower generates an NGL purity product. Liquefied petroleum gas is an NGL purity product comprising only propane, or a mixture of two or more NGL purity products, such as propane and butane. Liquefied petroleum gas is therefore a fractionated hydrocarbon or a fractionated hydrocarbon mixture.

In one embodiment, Y-Grade NGL comprises 30-80%, such as 40-60%, for example 43%, ethane, 15-45%, such as 20-35%, for example 27%, propane, 5-10%, for example 7%, normal butane, 5-40%, such as 10-25%, for example 10%, isobutane, and 5-25%, such as 10-20%, for example 13%, pentane plus. Methane is typically less than 1%, such as less than 0.5% by liquid volume.

In one embodiment, Y-Grade NGL comprises dehydrated, desulfurized wellhead gas condensed components that have a vapor pressure of not more than about 600 psig at 100 degrees Fahrenheit (° F.), with aromatics below about 1 weight percent, and olefins below about 1% by liquid volume. Materials and streams useful for the methods and systems described herein typically include hydrocarbons with melting points below about 0 degrees Fahrenheit (° F.).

In one embodiment, Y-Grade NGL may be mixed with fractionated or refined hydrocarbons to form a stimulation fluid. For example, C3+ hydrocarbons such as propane, butane, pentane, naphtha, toluene, diesel, and natural gasoline may be mixed with Y-Grade NGL to increase density and/or viscosity of the Y-Grade NGL (to form a stimulation fluid), which reduces the hydraulic horsepower requirement to treat a subsurface formation. The fractionated or refined hydrocarbons may include $C_3$, $C_4$, $C_5$, $C_6$, $C_7$, $C_8$, $C_9$, and mixtures thereof.

Figure 1:
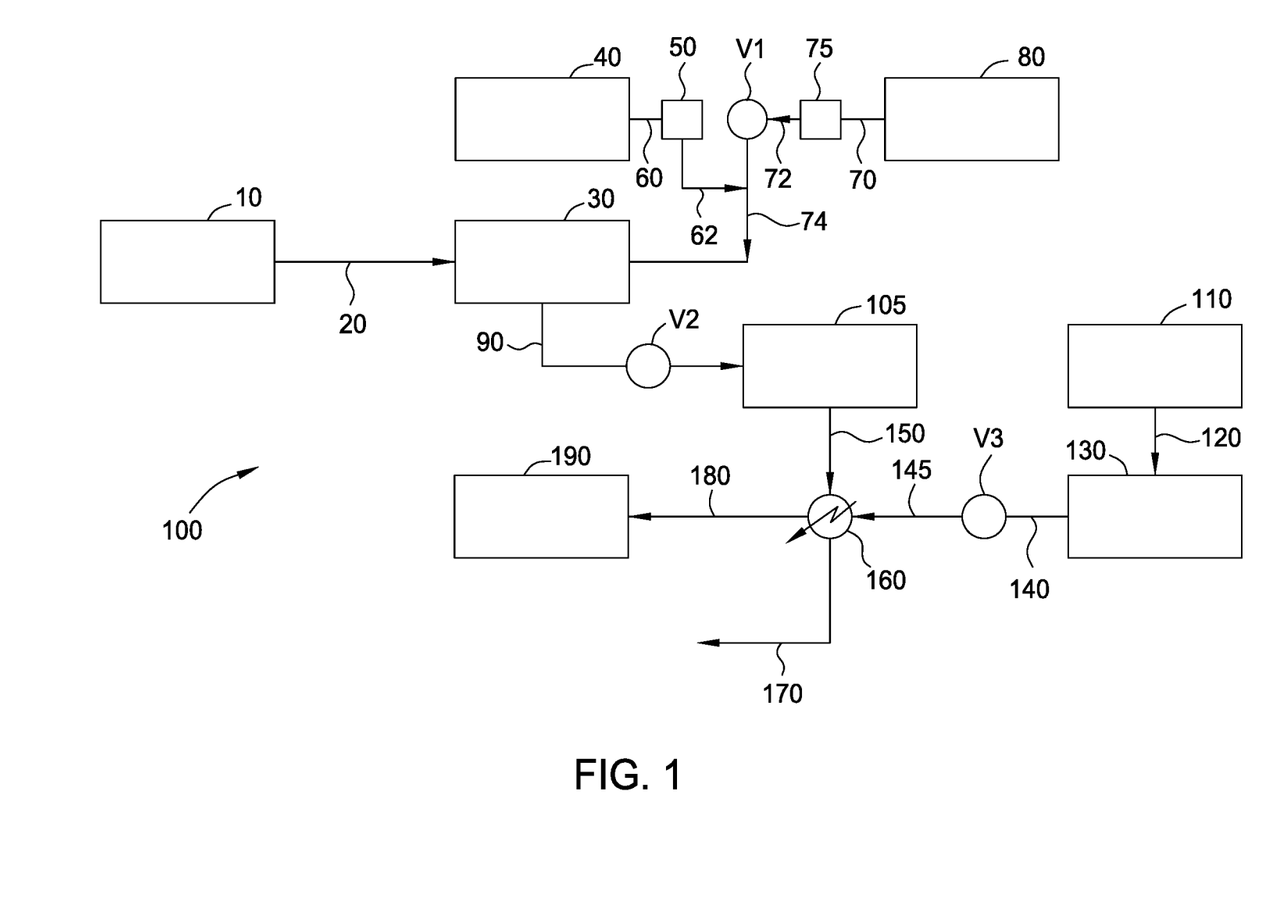
FIG. 1 is a plan view of a stimulation fluid system according to one embodiment.

FIG. 1 is a plan view of a stimulation fluid system 100 according to one embodiment. The system 100 includes a Y-Grade NGL storage unit 80, a gelling unit 40, and a proppant storage unit 10 fluidly coupled to a blender 30 by piping 20 and 74. Y-Grade NGL from the Y-grade NGL storage unit 80 is transferred to a pump 75 through piping 70, to a control valve V1 through piping 72, and to the blender 30 through piping 74. The gelling unit 40 is connected to a dosing pump 50 by piping 60, and the dosing pump 50 is connected to piping 74 by piping 62. A gelling agent is transferred from the gelling unit 40 (through piping 60, the dosing pump 50, and piping 62) into piping 74 and to the blender 30.

The blender 30 receives the Y-Grade NGL, the gelling agent, and the proppant (from proppant storage unit 10 via piping 20) mixes them together to form a proppant-laden fracturing fluid. The blender 30 is typically maintained at a pressure of 230 psig to 270 psig, for example about 250 psig. The blender 30 is a mixing vessel, which may be made from any convenient variety of steel, such as carbon steel. The blender 30 may include an abrasion resistant lining, which may include a fluoropolymer such as TEFLON. Mixing may be performed using a pumparound. The viscosity of the proppant-laden fracturing fluid may be controlled by adjusting the dosing pump 50. The liquid level in the blender 30 may be controlled by adjusting the flow rates of the Y-Grade NGL, the gelling agent, and/or the proppant into the blender 30. Alternately, the flow rates of the Y-Grade NGL, the gelling agent, and/or the proppant may be set by recipe control.

The proppant-laden fracturing fluid is transferred from the blender 30 through piping 90 and a control valve V2 into the suction of one or more high-pressure pumps 105, which are typically reciprocating pumps, fluidly coupled to an effluent portal of the blender 30. For the fracturing system 100 shown in FIG. 1, any convenient fracing pump may be used as the high-pressure pumps 105. The high-pressure pumps 105 boost pressure of the proppant-laden fracturing fluid to a wellhead pressure of 250 psig or more, such as 250 psig to 10,000 psig, for example about 10,000 psig, and discharge the pressurized proppant-laden fracturing fluid through piping 150 to a cooler 160.

The cooler 160 cools the pressurized proppant-laden fracturing fluid to a temperature of 0° F. or lower, for example as low as −60° F. The cooler 160 may be a shell-and-tube cooler, a tube-in-tube cooler, or other similar design, and is typically cooled by thermal contact with liquid nitrogen. Liquid nitrogen is obtained from a liquid nitrogen source 110, which may be a liquid nitrogen storage unit, and is transferred to one or more cryogenic pumps 130 through piping 120. The cryogenic pumps 130 discharge liquid nitrogen through piping 140 to a control valve V3, and from the control valve V3 through piping 145 into the cooler 160 to cool the pressurized proppant-laden fracturing fluid. The low temperature, pressurized proppant-laden fracturing fluid (also referred to as a stimulation fluid) discharges from the cooler 160 through piping 180 and is transferred to a wellhead 190 for injection into a subsurface formation. Nitrogen vaporized in the cooler 160 is discharged to a nitrogen vent through piping 170.

The cryogenic components of the system 100, such as the liquid nitrogen source 110, the cryogenic pumps 130, the control valve V3, the cooler 160, and piping 120, 140, 145, 150, 170, and/or 180 may be made of material resistant to low temperatures. Such materials may include, but are not limited to, carbon steel, stainless steel, nickel, Inconel, and austenitic stainless steel.

The low temperature components of the system 100, such as the liquid nitrogen source 110, the cryogenic pumps 130, the control valve V3, the cooler 160, and piping 120, 140, 145, 150, 170, and/or 180 may be insulated to avoid heat uptake and to enhance safety of operating personnel. Supplemental cooling may also be included with any insulation or jacketing by routing tubing or piping through the insulation, or between the insulation and the equipment, and providing additional liquid nitrogen through the tubing or piping.

Figure 2:
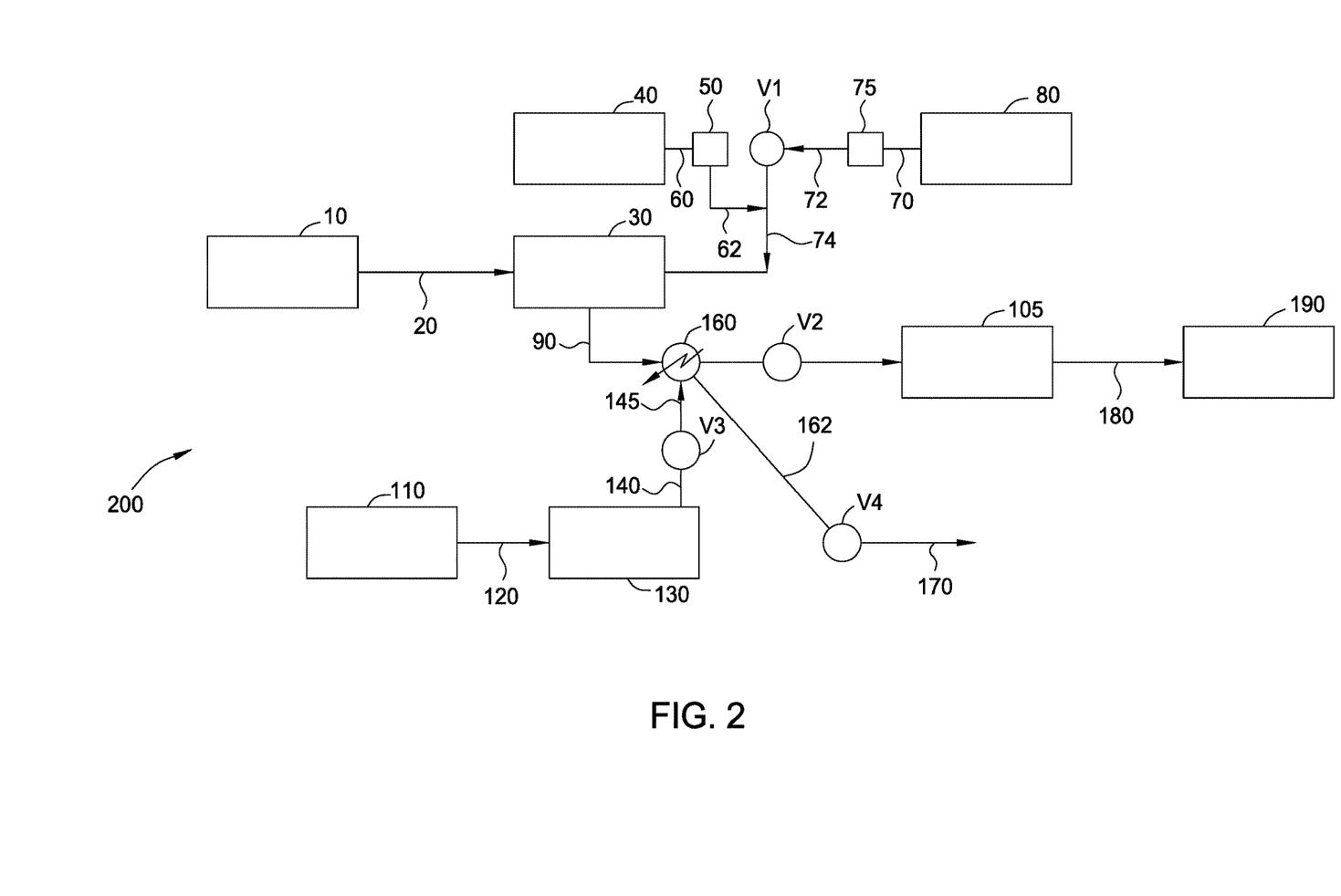
FIG. 2 is a plan view of a stimulation fluid system according to another embodiment.

FIG. 2 is a plan view of a stimulation fluid system 200 according to another embodiment. The system 200 is similar to the stimulation fluid system 100, with one difference being that the cooler 160 is located between the blender 30 and the high-pressure pumps 105. The cooler 160 may be located upstream of the control valve V2, as shown in FIG. 2, or between the control valve V2 and the high-pressure pumps 105. Locating the cooler 160 upstream of the high-pressure pumps 105 may prevent two-phase flow at the inlet of the high-pressure pumps 105 in some cases. Locating the cooler 160 upstream of the control valve V2 may prevent flashing through the control valve V2.

Liquid nitrogen from the liquid nitrogen source 110 is vaporized in the cooler 160, and flows through piping 162 to control valve V4, and then to a nitrogen vent through piping 170. The control valve V3 can be used to control the flow rate of the liquid nitrogen from the liquid nitrogen source 110, while the control valve V4 can be used to control back pressure in the coolant side of the cooler 160, which will change the equilibrium vaporization temperature of the liquid nitrogen.

In the system 200 shown in FIG. 2, the control valve V2 and the high-pressure pumps 105 may be resistant to cryogenic temperatures. For example, the control valve V2 may have one or more parts, such as a gate and a body, that contact the process fluids and are therefore made of cryogenic alloys, such as stainless steel, Inconel, and austenitic stainless steel. The low temperature equipment of the system 200 shown in FIG. 2, such as the control valves V2, V3, V4, the high-pressure pumps 105, the liquid nitrogen source 110, the cryogenic pumps 130, and/or piping 90, 120, 140, 145, 162, 170, and/or 180 may be insulated and may be provided with supplemental cooling as needed.

Figure 3:
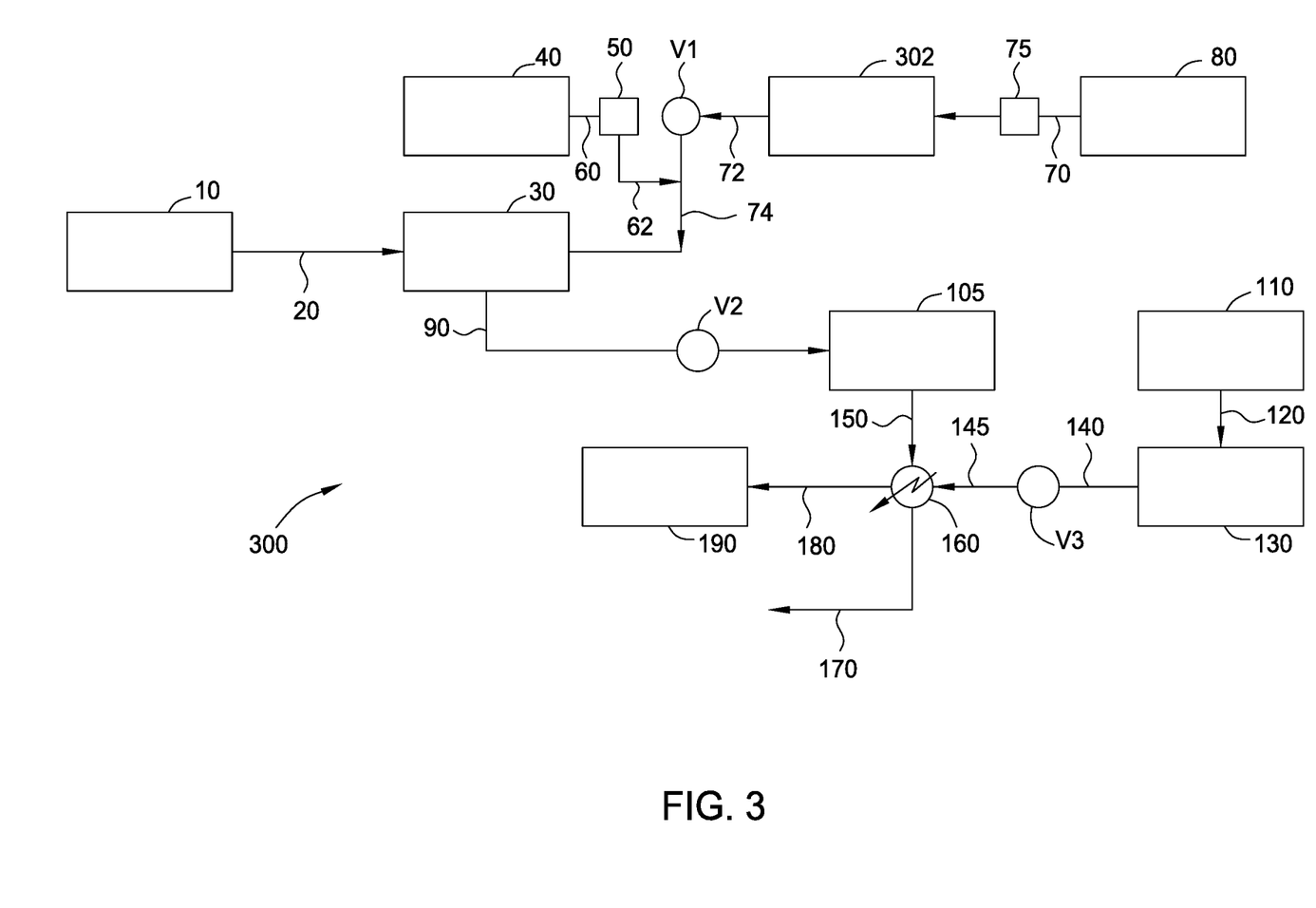
FIG. 3 is a plan view of a stimulation fluid system according to another embodiment.

FIG. 3 is a plan view of a stimulation fluid system 300 according to another embodiment. The system 300 is similar to the stimulation fluid system 100, with one difference being that a pre-cooling unit 302 is included between the Y-Grade NGL storage unit 80 and the blender 30. Typically the pre-cooling unit 302 is located between the pump 75 and the control valve V1 to lower the temperature of the Y-Grade NGL to between about 0° F. and about −20° F., for example about −20° F. Pre-cooling the Y-Grade NGL reduces the amount of liquid nitrogen from the liquid nitrogen source 110 that is needed for cooling the proppant-laden fracturing fluid to the final low temperature. The pre-cooling unit 302 may be any convenient refrigeration unit suitable for a wellhead, such as a propylene refrigeration unit. Power for the refrigeration unit may be generated by combusting a slip stream of the Y-Grade NGL, if desired.

Figure 4:
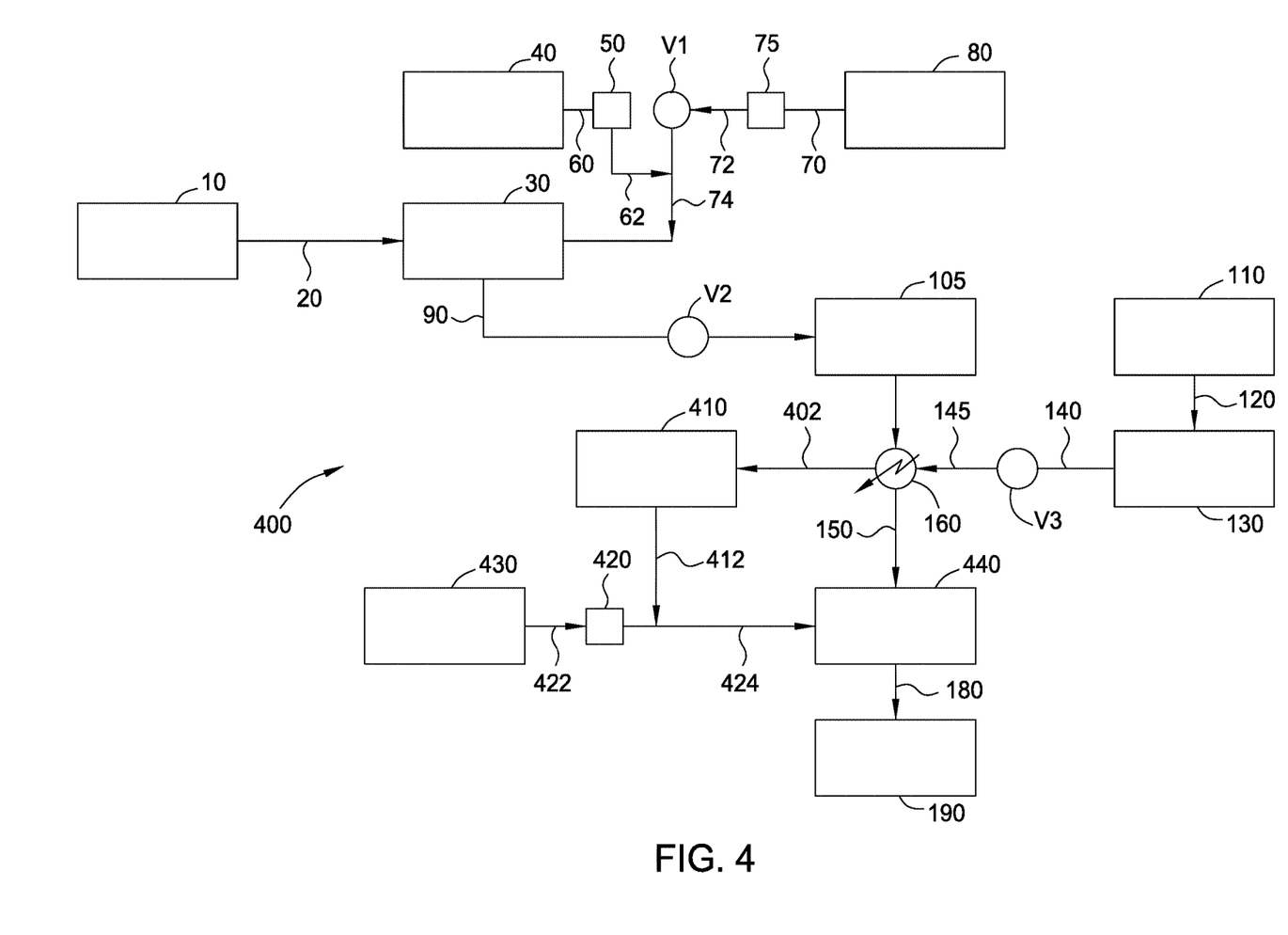
FIG. 4 is a plan view of a stimulation fluid system according to another embodiment.

FIG. 4 is a plan view of a stimulation fluid system 400 according to another embodiment. The system 400 is similar to the stimulation fluid system 100, with one difference being that the vaporized nitrogen from the cooler 160 is mixed with the proppant-laden fracturing fluid discharged from the cooler 160 to form foam.

Nitrogen from the cooler 160, which may be partially or completely vaporized in the cooler 160, is sent to a steam vaporizer 410 through piping 402, which ensures all nitrogen is vaporized. A foaming agent source 430 provides a foaming agent through piping 422, a control valve 420, and piping 424 to a foaming unit 440. The vaporized nitrogen is discharged from the steam vaporizer 410 through piping 412 into piping 424 to mix with the foaming agent to make foam. The foam flows to the foaming unit 440, where it is mixed with the proppant-laden fracturing fluid flowing from the cooler 160 to form a foamed, proppant-laden fracturing fluid (also referred to as a stimulation fluid). The foamed, proppant-laden fracturing fluid is then provided into the wellhead 190 through piping 180 for injection into a subsurface formation.

In one embodiment, the fraction of nitrogen in the foam may be between about 52% and 75% by bulk volume, for example about 75% by bulk volume. In one embodiment, the foamed, proppant-laden fracturing fluid comprises 75% quality foam and 25% Y-Grade NGL/proppant.

In one embodiment, the pre-cooling unit 302 of the system 300 shown in FIG. 3 may be incorporated into the system 400 shown in FIG. 4 in the same way it is used in the system 300 shown in FIG. 3. Using nitrogen vaporized in the cooler 160 to help create foam as in FIG. 4 adds a material balance constraint to the system 400 that is additional to the energy balance constraint from cooling the effluent of the high-pressure pumps 105. In the system 400 shown in FIG. 4, these two constraints may be met by adjusting the flow of liquid nitrogen from the liquid nitrogen source 110 to the cooler 160. In the event these constraints should conflict, for example if more nitrogen is needed for foaming but less nitrogen is needed for cooling, adjusting the flow of liquid nitrogen from the liquid nitrogen source 110 to the cooler 160 might not satisfy both constraints. Using the pre-cooling unit 302 may decouple the material and energy balance constraints at least partially by allowing an independent control on cooling so that nitrogen for foaming can be increased if needed while cooling is held constant or reduced if needed, and vice versa.

Figure 5:
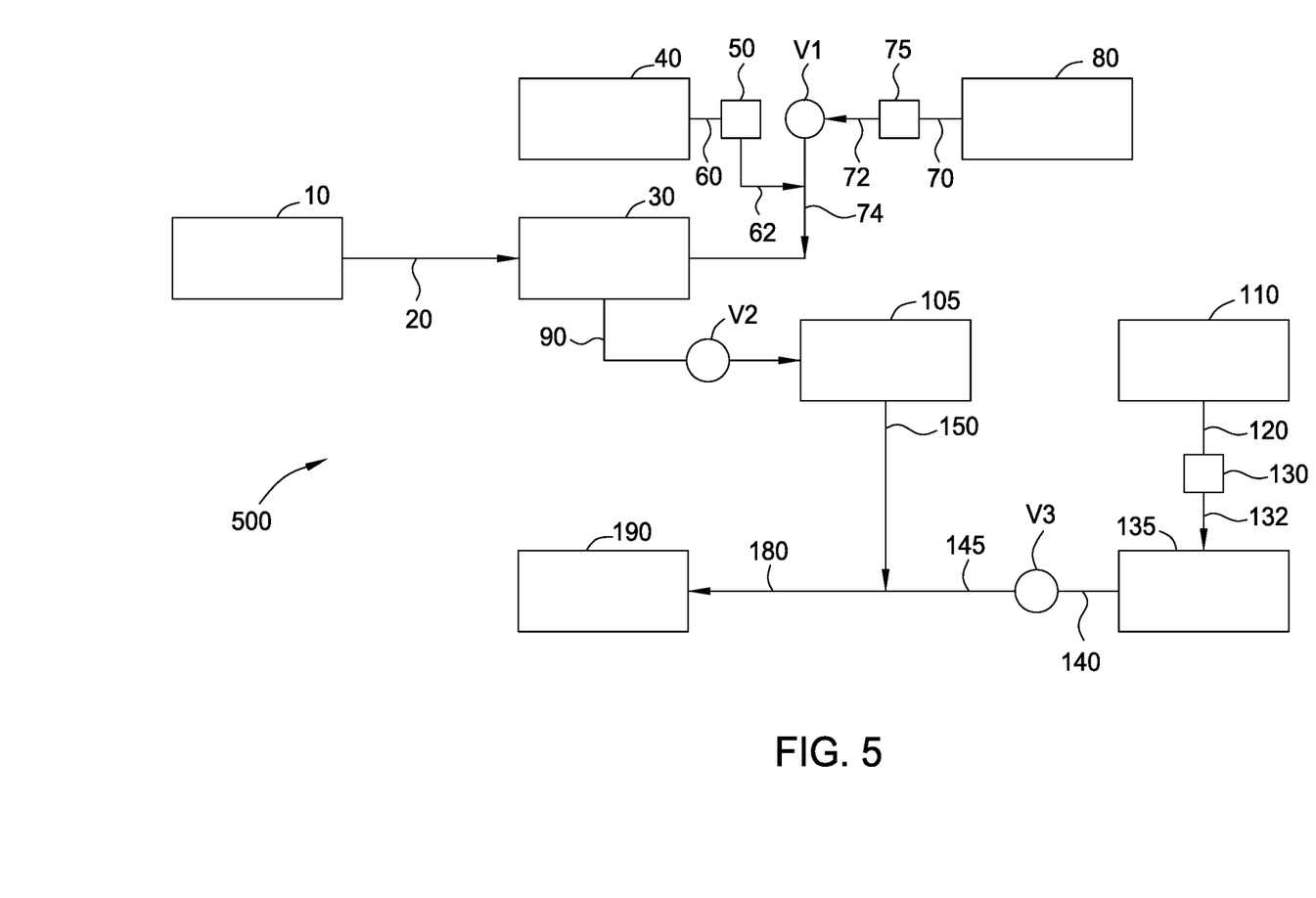
FIG. 5 is a plan view of a stimulation fluid system according to another embodiment.

FIG. 5 is a plan view of a stimulation fluid system 500 according to another embodiment. The system 500 is similar to the stimulation fluid system 100, with some differences being that the cooler 160 has been removed and replaced with a high pressure vaporizer 135, the blender 30 has been replaced with a mixer-blender 30 (that can handle high concentrations of proppant), and the gelling unit 40 is replaced with a combination gelling and foaming unit 40 to supply a foaming agent (such as a surfactant) and optionally a gelling agent. The combination gelling and foaming unit 40 may supply a pre-blended mixture (as a liquid and/or a solid) of a foaming agent and a gelling agent into piping 60, and/or may supply a foaming agent and a gelling agent separately but both into piping 60.

Y-Grade NGL from the Y-Grade NGL storage unit 80 is transferred via pump 75 to piping 74, where it is mixed with a foaming agent (such as a surfactant) and optionally a gelling agent both from the combination gelling and foaming unit 40 and transferred to piping 74 via dosing pump 50. From piping 74, the Y-Grade NGL, the foaming agent, optional gelling agent, and proppant (from the proppant storage unit 10) are mixed in the mixer-blender 30 and discharged via piping 90 to the high-pressure pumps 105. The Y-Grade NGL, foaming agent, optional gelling agent, and proppant mixture flows through the high-pressure pumps 105, which boosts the pressure of the mixture and discharges the mixture to piping 180 via piping 150.

Liquid nitrogen obtained from the liquid nitrogen source 110, which may be a liquid nitrogen storage unit, is transferred to one or more cryogenic pumps 130 through piping 120. The cryogenic pumps 130 discharge the liquid nitrogen through piping 132 into the vaporizer 135 where the liquid nitrogen is converted into high pressure gaseous nitrogen. The high pressure gaseous nitrogen is discharged via piping 140 to the control valve V3, and from the control valve V3 through piping 145 directly into piping 180, where it mixes with and cools the pressurized Y-Grade NGL, foaming agent, optional gelling agent, and proppant mixture to generate foam. The foam (also referred to as a stimulation fluid) is then supplied into the wellhead 190 for injection into a subsurface formation.

In the embodiment of FIG. 5, the control valve V3 and piping 120, 132, 140, 145, 150, and/or 180 may be resistant to cryogenic temperatures. For example, the control valve V3 may have one or more parts, such as a gate and a body, that contact the process fluids and are therefore made of cryogenic alloys such as stainless steel, Inconel, and austenitic stainless steel. The low temperature equipment of FIG. 5, such as the control valve V3, piping 120, 132, 140, 145, 150, and/or 180, the liquid nitrogen source 110, the cryogenic pumps 130, and/or the vaporizer 135 may be insulated.

Figure 6:
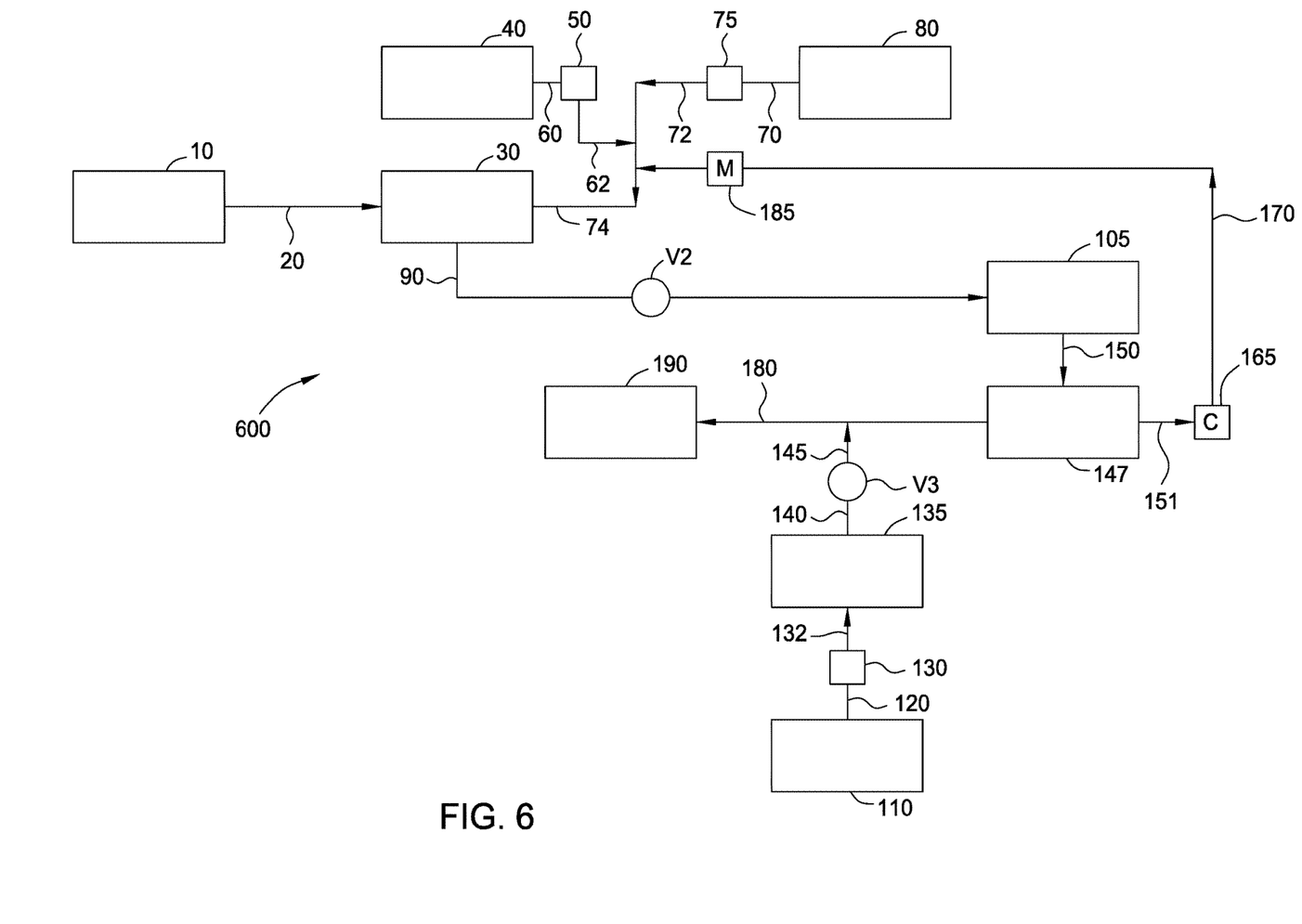
FIG. 6 is a plan view of a stimulation fluid system according to another embodiment.

FIG. 6 is a plan view of a stimulation fluid system 600 according to another embodiment. The system 600 is similar to the stimulation fluid system 500, with one difference being that a concentrator 147 has been installed onto piping 150 from the high-pressure pumps 105 to remove excess Y-Grade NGL, thus concentrating the remaining pressurized, Y-Grade NGL, foaming agent, optional gelling agent, proppant mixture that is discharged into piping 180. Excess Y-Grade NGL is removed from the concentrator 147 through piping 106. A choke assembly 165 reduces fluid pressure to enable Y-Grade NGL recycling. Y-Grade NGL discharged from the choke assembly 165 flows through piping 170 where it is metered by turbine-meter 185 and recycled back into the mixer-blender 30 via piping 74.

Liquid nitrogen obtained from the liquid nitrogen source 110, which may be a liquid nitrogen storage unit, is transferred via piping 120 to one or more cryogenic pumps 130. The cryogenic pumps 130 discharge liquid nitrogen through piping 132 into the vaporizer 135, which converts the liquid nitrogen to high pressure gaseous nitrogen. The high pressure gaseous nitrogen exits the vaporizer 135 via piping 140 into the control valve V3, and from the control valve V3 through piping 145 directly into piping 180, where it mixes with and cools the concentrated Y-Grade NGL, foaming agent, optional gelling agent, and proppant mixture in piping 180 to generate foam. The foam (also referred to as a stimulation fluid) is then supplied into the wellhead 190 for injection into a subsurface formation.

In the embodiment of FIG. 6, the control valve V3 and piping 120, 132, 140, 145, and/or 180 may be resistant to cryogenic temperatures. For example, the control valve V3 may have one or more parts, such as a gate and a body, that contact the process fluids and are therefore made of cryogenic alloys such as stainless steel, Inconel, and austenitic stainless steel. The low temperature equipment of FIG. 6, such as the control valve V3, piping 120, 132, 140, 145, and/or 180, the liquid nitrogen source 110, the cryogenic pumps 130, and the vaporizer 135 may be insulated and may be provided with supplemental cooling as needed.

Figure 7:
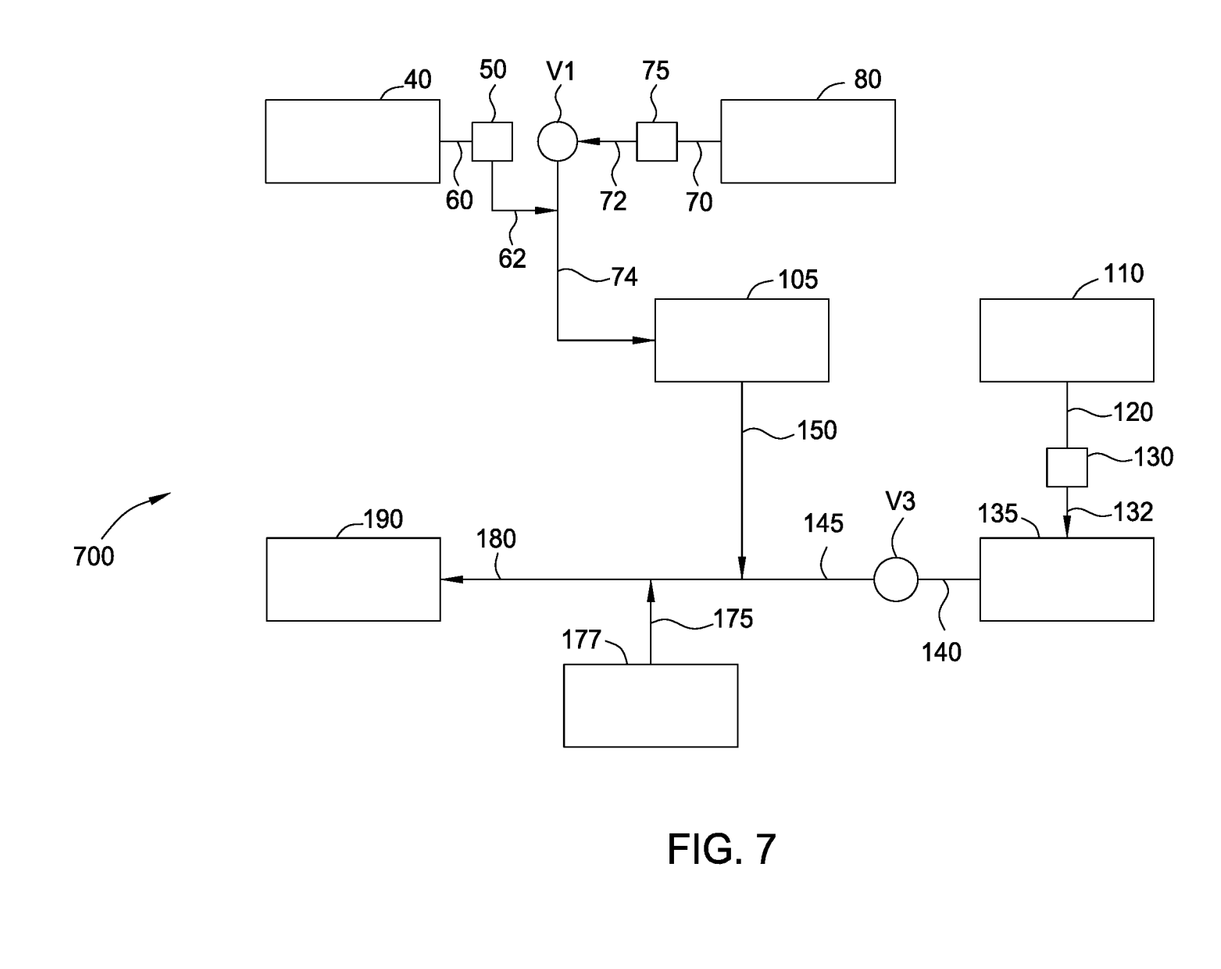
FIG. 7 is a plan view of a stimulation fluid system according to another embodiment.

FIG. 7 is a plan view of a stimulation fluid system 700 according to another embodiment. The system 700 is similar to the stimulation fluid system 500, with one difference being that a pressurized proppant system 177 has been added downstream of the high pressure pumps 105 to replace the proppant storage unit 10 and the mixer-blender 30.

The system 700 includes the Y-Grade NGL storage unit 80, the pump 75, the combination gelling and foaming unit 40, the dosing pump 50, one or more high-pressure pumps 105, the liquid nitrogen source 110, one or more cryogenic pumps 130, the vaporizer 135, and the pressurized proppant system 177. Y-Grade NGL from the Y-Grade NGL storage unit 80 is transferred via pump 75 to piping 74, where it is mixed with a foaming agent (such as a surfactant) and optionally a gelling agent both supplied from the combination gelling and foaming unit 40 and transferred to piping 74 via dosing pump 50. The mixture in piping 74 flows through the high-pressure pumps 105, which boosts the pressure of the mixture and discharges the mixture to piping 180 via piping 150.

Liquid nitrogen obtained from the liquid nitrogen source 110, which may be a liquid nitrogen storage unit, is transferred via piping 120 to one or more cryogenic pumps 130. The cryogenic pumps 130 discharge the liquid nitrogen through piping 132 into the vaporizer 135, which converts the liquid nitrogen to high pressure gaseous nitrogen. The high pressure gaseous nitrogen exits the vaporizer 135 via piping 140 into the control valve V3, and flows from the control valve V3 through piping 145 directly into piping 180 where it mixes with and cools the pressurized Y-Grade NGL, foaming agent, and optional gelling agent mixture to generate foam. Pressurized proppant from the pressurized proppant system 177 is injected via piping 175 into the foam in piping 180. The proppant-laden foam (also referred to as a stimulation fluid) is then supplied into the wellhead 190 for injection into a subsurface formation.

In the embodiment of FIG. 7, the control valve V3, piping 120, 132, 140, 145, 150, 175, and/or 180 may be resistant to cryogenic temperatures. For example, the control valve V3 may have parts, such as a gate and a body, that contact the process fluids and are therefore made of cryogenic alloys such as stainless steel, Inconel, and austenitic stainless steel. The low temperature equipment of FIG. 7, such as the control valve V3, piping 120, 132, 140, 145, 150, 175, and/or 180, the liquid nitrogen source 110, the cryogenic pumps 130, and the vaporizer 135 may be insulated and may be provided with supplemental cooling as needed.

Figure 8:
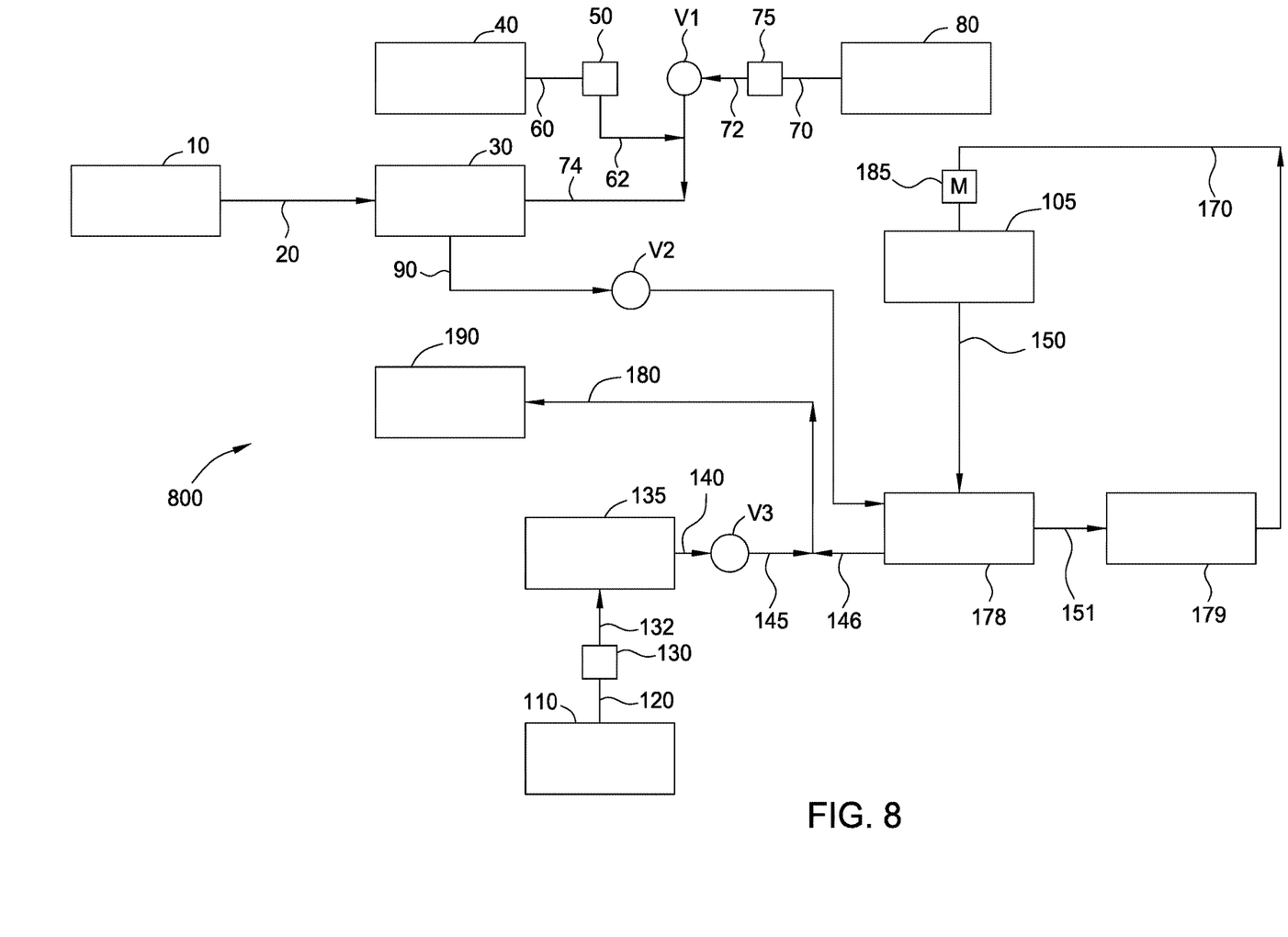
FIG. 8 is a plan view of a stimulation fluid system according to another embodiment.

FIG. 8 is a plan view of a stimulation fluid system 800 according to another embodiment. The system 800 is similar to the stimulation fluid system 500, with one difference being a VorTeq system 178 that has been added to form a closed loop so that the proppant-laden fluid from the mixer-blender 30 does not flow through the high-pressure pumps 105.

The system 800 includes the Y-Grade NGL storage unit 80, the pump 75, the combination gelling and foaming unit 40, the dosing pump 50, the proppant storage unit 10, the mixer-blender 30, one or more high-pressure pumps 105, the liquid nitrogen source 110, one or more cryogenic pumps 130, the vaporizer 135, and the VorTeq system 178. Y-Grade NGL from the Y-Grade NGL storage unit 80 is transferred via pump 75 to piping 74, where it is mixed with a foaming agent (such as a surfactant) and optionally a gelling agent both supplied from the combination gelling and foaming unit 40 and transferred to piping 74 via dosing pump 50. The Y-Grade NGL, foaming agent, and optional gelling agent mixture are mixed with proppant from the proppant storage unit 10 in the mixer-blender 30.

The proppant-laden mixture from the mixer-blender 30 flows through the VorTeq system 178 (via piping 90), which pressurizes the proppant-laden mixture using a pressurized fluid (also referred to as a power fluid) supplied from the high-pressure pumps 105 to the VorTeq system 178 via piping 150. The VorTeq system 178 minimizes fluid contact between the power fluid and the proppant-laden mixture, while transferring the hydraulic pressure to boost the pressure of the proppant-laden mixture. The now pressurized proppant-laden mixture discharges to piping 146, and the expended power fluid discharges through piping 151 to a separator 179, which separates out any solid material that may have mixed into the expended power fluid. From the separator 179, the expended power fluid is metered by turbine-meter 185 and cycled back to the high-pressure pumps 105 via piping 170 to be re-pressurized. The re-pressurized power fluid that cycles through the closed loop, including the high-pressure pumps 105, the VorTeq system 178, and the separator 179, may comprise Y-Grade NGL, diesel, or any other hydrocarbon based fluid.

Liquid nitrogen obtained from the liquid nitrogen source 110, which may be a liquid nitrogen storage unit, is transferred via piping 120 to one or more cryogenic pumps 130. The cryogenic pumps 130 discharge the liquid nitrogen through piping 132 into the vaporizer 135, which converts the liquid nitrogen to high pressure gaseous nitrogen. The high pressure gaseous nitrogen exits the vaporizer 135 via piping 140 into the control valve V3, and flows from the control valve V3 through piping 145 into piping 180 where it mixes with and cools the pressurized, proppant-laden mixture to generate foam. The proppant-laden foam (also referred to as a stimulation fluid) is then supplied into the wellhead 190 for injection into a subsurface formation.

In the embodiment of FIG. 8, the control valve V3, piping 120, 132, 140, 145, and/or 180 may be resistant to cryogenic temperatures. For example, the control valve V3 may have parts, such as a gate and a body, that contact the process fluids and are therefore made of cryogenic alloys such as stainless steel, Inconel, and austenitic stainless steel. The low temperature equipment of FIG. 7, such as the control valve V3, piping 120, 132, 140, 145, and/or 180, the liquid nitrogen source 110, the cryogenic pumps 130, and the vaporizer 135 may be insulated and may be provided with supplemental cooling as needed.

In one embodiment, any of the systems 100, 200, 300, 400, 500, 600, 700, 800 may include a VORTEQ system (a hydraulic pumping system developed by Energy Recovery, Inc.) to protect the high-pressure pumps 105 from damage that may be caused by flowing proppant through the high-pressure pumps 105. Using the VORTEQ system, proppant may be routed away from and by-pass the high-pressure pumps 105.

In one embodiment, the high-pressure pumps 105 of any of the systems 100, 200, 300, 400, 500, 600, 700 may be cementing units.

The stimulation fluid provided by any of the systems 100, 200, 300, 400, 500, 600, 700, 800 may be injected into a subsurface formation at a pressure that overcomes the physical strength of the rock of the subsurface formation to fracture the rock formation. In some cases, the pressure needed to fracture the rock formation is about 7,000 psig, but pressures up to 10,000 psig may be used to create fractures at greater depths. As the stimulation fluid is pumped into the rock formation, pressure builds as the rock formation is filled with the stimulation fluid and flow areas become increasingly restricted. When pressure within the rock formation reaches a critical point, sometimes referred to as "breakdown pressure," fractures begin to nucleate and grow within the rock formation. When the rock formation begins to yield, pressure may drop to a fracture propagation range.

The stimulation fluid provided by any of the systems 100, 200, 300, 400, 500, 600, 700, 800 may be injected into a subsurface formation at a temperature that cools and lowers the temperature of the rock of the subsurface formation to fracture the rock formation. In some cases, the rock of the subsurface formation may have been previously fractured by hydraulic fracturing, and the cooling (or thermal shock) provided by the stimulation fluid creates additional fractures in the rock of the subsurface formation. In some cases, the stimulation fluid may be injected into the subsurface formation at a temperature that cools and lowers the temperature of the rock of the subsurface formation but does not fracture the rock formation.

The stimulation fluid provided by any of the systems 100, 200, 300, 400, 500, 600, 700, 800 may comprise a gelling agent. The gelling agent may include phosphate esters, and may additionally include organometallic cross-linking agents.

The stimulation fluid provided by any of the systems 100, 200, 300, 400, 500, 600, 700, 800 may optionally comprise a proppant. The proppant supplied from the proppant storage unit 10 or the pressurized proppant system 177 may be optionally added to any of the stimulation fluids. The proppant may include sand and/or ceramic materials. The proppant may be supplied from a pressurized proppant system. The proppant supplied may be "bone dry" (e.g. substantially free from any liquid, such as water) when mixed to form the stimulation fluid.

The stimulation fluid provided by any of the systems 100, 200, 300, 400, 500, 600, 700, 800 may comprise a foaming agent. The foaming agent may comprise one or more surfactants and/or mixtures thereof. The foaming agent may comprise ionic surfactants, nonionic surfactants, anionic surfactants, and/or cationic surfactants. The foaming agent may comprise one or more surfactants having anionic, nonionic, and/or amphoteric structures. The foaming agent may comprise a pure surfactant or a surfactant mixture, may be blended with co-surfactants, and may be aqueous solutions of surfactants and/or co-surfactants, and optionally co-solvents. Co-surfactants may comprise iC90-glycol and/or iC10-glycol. Co-solvents may comprise 1-propanol, isopropanol, 2-butanol, and/or butyl glycol.

The foaming agent may comprise sulfonic acids, betaine compounds, fluorosurfactants, hydrocarbon solvents, aluminum soaps, phosphate esters, and/or other similar products. Further examples of foaming agents comprise alcoholethersulfates, alcohol sulfate, alcylsulfates, isethionates, sarconisates, acylsarcosinates, olefinsulfonates, alcylethercarboxylates, alcylalcoholamides, aminoxids, alkylbenzolsulfonate, alkylnaphthalene sulfonates, fattyalcohol ethoxylates, oxoalcohol ethoxylates, alkylethoxylates, alkylphenolethoxylates, fattyamin- and fattyamidethoxylates, alkylpolyglucosides, oxoalcohol ethoxylates, and/or guerbetalcohol alkoxylates. Further examples of foaming agents comprise alkylethersulfonate, EO/PO blockpolymers, and/or betaines such as cocamidopropylbetaine and C8-C10 alkylamidopropylbetaine. Further examples of foaming agents comprise sulfobetaines, alkenylsulfonates, alkylglykols, alcoholalkoxylates, sulfosuccinates, alkyletherphosphates, esterquats, and/or di- and trialcylammoniumderivatives.

The stimulation fluid provided by any of the systems 100, 200, 300, 400, 500, 600, 700, 800 may comprise a foam stabilizer. The foam stabilizer may comprise microparticles or nanoparticles, such as silica or silica derivatives that are known to stabilize foam and emulsions through so-called "pickering". The foam stabilizer may comprise proteins. The foam stabilizer may comprise additives that increase the viscosity of the stimulation fluid composing the lamella, such as polymeric structures, e.g. polyacrylamide and/or its derivatives.

The stimulation fluid provided by any of the systems 100, 200, 300, 400, 500, 600, 700, 800 may be formed with nitrogen and/or carbon dioxide, and include one or more foaming agents, such as a surfactant, to form foam. The gas content of the stimulation fluid (including the foam for example) may be between about 55% to about 95% by volume.

The stimulation fluid provided by any of the systems 100, 200, 300, 400, 500, 600, 700, 800 may be a waterless mixture comprising one or more gelling agents, foaming agents, foam stabilizers, and/or proppants.

The stimulation fluid provided by any of the systems 100, 200, 300, 400, 500, 600, 700, 800 may be injected into a subsurface formation at a low temperature, such as at or below about 0° F., for example as low as −60° F.

In one embodiment, a method of treating a subsurface formation comprises mixing a proppant, Y-Grade NGL, and at least one of a gelling agent and a foaming agent to form a stimulation fluid; increasing the pressure of the stimulation fluid using one or more high pressure pumps; and injecting the stimulation fluid into the subsurface formation at a temperature at or below about 0° F.

In one embodiment, a stimulation fluid system comprises a Y-Grade NGL storage unit; at least one of a gelling unit, a foaming unit, and a proppant storage unit fluidly coupled to a mixer-blender; and a high pressure pump fluidly coupled to the mixer-blender.

Figure 9:
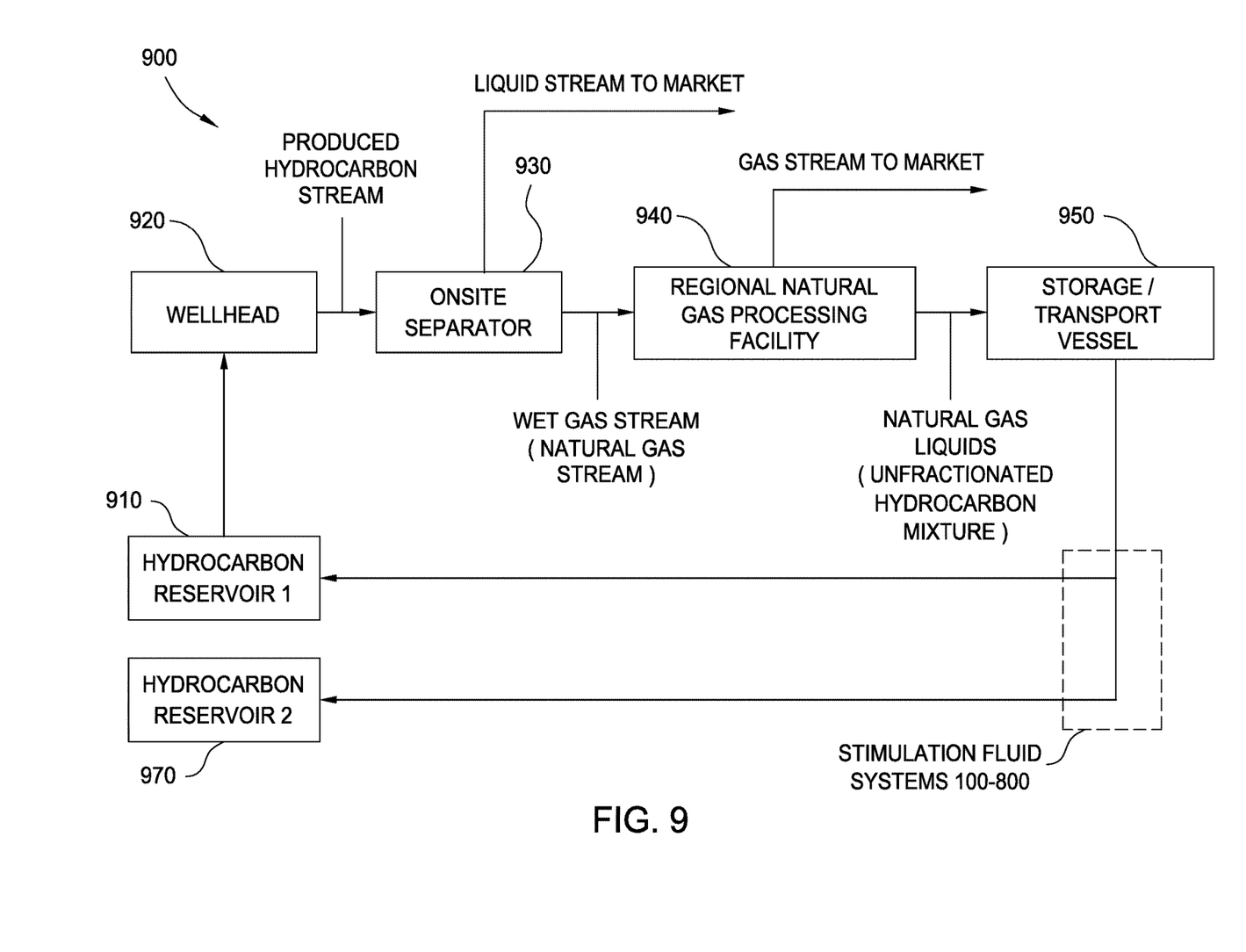
FIG. 9 is a plan view of a fluid recovery system according to one embodiment.

FIG. 9 illustrates one embodiment of a fluid recovery system 900 for obtaining Y-Grade NGL that can be used with any of the stimulation fluid systems 100, 200, 300, 400, 500, 600, 700, 800. As illustrate in FIG. 9, a stream of hydrocarbons are produced from a first hydrocarbon reservoir 910 to the surface via a wellhead 920 (which could be wellhead 190 for example) where the produced hydrocarbon stream is flash separated onsite by an onsite separator 930 into a wet gas stream (also referred to as a natural gas stream) and a liquid stream. The natural gas stream is transported, via pipeline for example, to a regional natural gas processing facility 940 where it is further processed, and the liquid stream is transported to field storage for example where it is sold into the market.

The natural gas stream enters the natural gas processing facility 940 where it is dehydrated and decontaminated of CO2, H2S, and N2. The dehydrated and decontaminated natural gas stream is then expanded and cooled to condense out natural gas liquids. These natural gas liquids ("NGL") are an unfractionated hydrocarbon mixture, which is referred to as Y-Grade NGL, raw mix, or unfractionated NGL. The remaining gas stream is transported to a pipeline for example where it is sold into the market.

The unfractionated hydrocarbon mixture is a liquid mixture that has been condensed from the natural gas stream at the natural gas processing facility 940. The condensation process is the result of expanding and cooling the natural gas stream to condense out the unfractionated hydrocarbon mixture, a process also referred to as demethanizing the natural gas stream. The unfractionated hydrocarbon mixture is therefore a natural byproduct of a de-methanized hydrocarbon stream.

The unfractionated hydrocarbon mixture is then stored in a storage/transport vessel 950 (such as storage units 80 of any of the stimulation fluid systems 100, 200, 300, 400, 500, 600, 700, 800) for use to form a stimulation fluid using any of the stimulation fluid systems 100, 200, 300, 400, 500, 600, 700, 800. The stimulation fluid may be injected back into the first hydrocarbon bearing wellbore 910 and/or another hydrocarbon bearing reservoir 970 of the same of a different well to treat the reservoirs.

While the foregoing is directed to certain embodiments, other and further embodiments may be devised without departing from the basic scope of this disclosure.

The invention claimed is:

1. A method of treating a subsurface formation, comprising:
   increasing a pressure of an unfractionated hydrocarbon liquid mixture;
   cooling the pressurized unfractionated hydrocarbon liquid mixture to a temperature at or below 0 degrees Fahrenheit;
   mixing the cooled and pressurized unfractionated hydrocarbon liquid mixture with a foaming agent and a gas to form a waterless stimulation fluid comprising foam, wherein the unfractionated hydrocarbon liquid mixture comprises ethane, propane, butane, isobutane, pentane, and less than 1 percent methane, and wherein the unfractionated hydrocarbon liquid mixture is a byproduct of a de-methanized hydrocarbon stream; and
   injecting the waterless stimulation fluid into the subsurface formation at the temperature at or below 0 degrees Fahrenheit to thermally fracture the subsurface formation.

2. The method of claim 1, wherein the foaming agent comprises one or more surfactants.

3. The method of claim 1, wherein the gas comprises vaporized nitrogen, and further comprising mixing the vaporized nitrogen with the foaming agent to form foam.

4. The method of claim 1, further comprising mixing a foam stabilizer with the unfractionated hydrocarbon liquid mixture and the foaming agent to form the stimulation fluid.

5. The method of claim 1, further comprising mixing a proppant with the unfractionated hydrocarbon liquid mixture and the foaming agent to form the stimulation fluid.

6. The method of claim 1, further comprising hydraulically fracturing the subsurface formation with the stimulation fluid.

7. The method of claim 1, further comprising cooling the subsurface formation with the stimulation fluid.

8. The method of claim 1, further comprising mixing a gelling agent with the unfractionated hydrocarbon liquid mixture and the foaming agent to form the stimulation fluid.

9. The method of claim 1, further comprising supplying liquid nitrogen to a cooler to cool the pressurized unfractionated hydrocarbon liquid mixture to the temperature at or below 0 degrees Fahrenheit, vaporizing the liquid nitrogen from the cooler to form the gas, mixing the gas in the form of vaporized nitrogen with the foaming agent to form foam, and then mixing the foam with the cooled and pressurized unfractionated hydrocarbon liquid mixture to form the waterless stimulation fluid comprising foam.

10. A method of treating a subsurface formation, comprising:
- mixing an unfractionated hydrocarbon liquid mixture with a proppant to form a waterless stimulation fluid, wherein the unfractionated hydrocarbon liquid mixture comprises ethane, propane, butane, isobutane, pentane, and less than 1 percent methane, and wherein the unfractionated hydrocarbon liquid mixture is a byproduct of a de-methanized hydrocarbon stream;
- increasing a pressure of the stimulation fluid;
- cooling the stimulation fluid to a temperature at or below 0 degrees Fahrenheit; and
- injecting the stimulation fluid into the subsurface formation at the temperature at or below 0 degrees Fahrenheit to thermally fracture the subsurface formation.

11. The method of claim 10, further comprising mixing a foaming agent with the unfractionated hydrocarbon liquid mixture and the proppant to form the stimulation fluid comprising foam.

12. The method of claim 10, further comprising mixing a gelling agent with the unfractionated hydrocarbon liquid mixture and the proppant to form the stimulation fluid.

13. The method of claim 10, further comprising mixing vaporized nitrogen with the unfractionated hydrocarbon liquid mixture and the proppant to form the stimulation fluid.

14. A stimulation fluid system, comprising:
- a storage unit comprising an unfractionated hydrocarbon liquid mixture, wherein the unfractionated hydrocarbon liquid mixture comprises ethane, propane, butane, isobutane, pentane, and less than 1 percent methane, and wherein the unfractionated hydrocarbon liquid mixture is a byproduct of a de-methanized hydrocarbon stream;
- a high pressure pump configured to pressurize the unfractionated hydrocarbon liquid mixture to a pressure within a range of 250 psig to 10,000 psi in fluid communication with the storage unit;
- a cooler in fluid communication with the high pressure pump;
- a liquid nitrogen source in fluid communication with the cooler; and
- at least one of a gelling unit, a foaming unit and a proppant storage unit.

15. The system of claim 14, further comprising a vaporizer that is in fluid communication with the high pressure pump.

16. The system of claim 14, further comprising a mixer-blender in fluid communication with the storage unit and at least one of the gelling unit, the foaming agent unit, and the proppant storage unit.

17. The system of claim 14, further comprising a pressurized proppant supply located downstream of the high pressure pump.

* * * * *